(12) United States Patent
Obaidi et al.

(10) Patent No.: US 10,575,180 B2
(45) Date of Patent: Feb. 25, 2020

(54) SECURING IDENTITIES OF CHIPSETS OF MOBILE DEVICES

(71) Applicant: T-Mobile USA, Inc., Bellevue, WA (US)

(72) Inventors: Ahmad Arash Obaidi, San Ramon, CA (US); Darren J. Kress, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/702,606

(22) Filed: Sep. 12, 2017

(65) Prior Publication Data

US 2018/0007559 A1 Jan. 4, 2018

Related U.S. Application Data

(63) Continuation of application No. 15/181,228, filed on Jun. 13, 2016, now Pat. No. 9,769,671.

(51) Int. Cl.
*H04W 12/12* (2009.01)
*H04W 12/08* (2009.01)
*H04W 12/06* (2009.01)
*H04W 12/00* (2009.01)

(52) U.S. Cl.
CPC .......... *H04W 12/12* (2013.01); *H04W 12/06* (2013.01); *H04W 12/08* (2013.01); *H04M 2203/6027* (2013.01); *H04W 12/00503* (2019.01); *H04W 12/00512* (2019.01)

(58) Field of Classification Search
CPC ....... H04W 12/12; H04W 4/02; H04W 88/16; H04M 2203/6027

USPC .... 455/410, 411, 412.1, 412.2, 414.1, 435.1, 455/461, 551
See application file for complete search history.

(56) References Cited

U.S. PATENT DOCUMENTS

| | | | |
|---|---|---|---|
| 6,707,915 B1 * | 3/2004 | Jobst | H04L 63/083 380/247 |
| 9,271,251 B2 | 2/2016 | Narkar et al. | |
| 9,692,752 B2 * | 6/2017 | Keys | H04L 63/0838 |
| 2006/0050680 A1 * | 3/2006 | Naim | H04L 63/062 370/352 |
| 2007/0206632 A1 | 9/2007 | Doo | |
| 2009/0328144 A1 * | 12/2009 | Sherlock | G06F 21/10 726/2 |

(Continued)

OTHER PUBLICATIONS

Office action for U.S. Appl. No. 15/181,228, dated Feb. 8, 20217, Obaidi et al., "Securing Identities of Chipsets of Mobile Devices", 6 pages.

*Primary Examiner* — Congvan Tran
(74) *Attorney, Agent, or Firm* — Lee & Hayes, P.C.

(57) ABSTRACT

A method of verifying IMEIs and chipset S/Ns of devices within a wireless communication network. The method comprises receiving a request from a device to access the wireless communication network and receiving an international mobile equipment identity (IMEI) and serial number (S/N) from the device, wherein the IMEI and S/N are included on a chipset of the device, and wherein the S/N is the S/N for the chipset. The method further comprises comparing the IMEI and S/N with a database to confirm the authenticity of the IMEI and S/N. Based upon the authenticity of the IMEI and S/N, the request is either granted or not granted for the device to access the wireless communication network.

20 Claims, 5 Drawing Sheets

(56) References Cited

U.S. PATENT DOCUMENTS

| | | | |
|---|---|---|---|
| 2012/0054841 A1* | 3/2012 | Schultz | G06F 21/44 |
| | | | 726/6 |
| 2012/0221464 A1 | 8/2012 | Pasquero et al. | |
| 2012/0300927 A1* | 11/2012 | Choi | H04W 12/06 |
| | | | 380/247 |
| 2014/0018059 A1 | 1/2014 | Noonan | |
| 2014/0194084 A1 | 7/2014 | Noonan et al. | |
| 2014/0335831 A1* | 11/2014 | Lamberton | H04W 8/24 |
| | | | 455/411 |
| 2015/0038120 A1* | 2/2015 | Larkin | G06Q 20/3223 |
| | | | 455/411 |
| 2015/0237487 A1 | 8/2015 | Titcombe et al. | |
| 2016/0014596 A1 | 1/2016 | Khan et al. | |

\* cited by examiner

SECURING IDENTITIES OF CHIPSETS OF MOBILE DEVICES

CROSS REFERENCE TO RELATED APPLICATIONS

This is a continuation application which claims priority to commonly assigned, co-pending U.S. patent application Ser. No. 15/181,228, filed Jun. 13, 2016. Application Ser. No. 15/181,228 is fully incorporated herein by reference.

BACKGROUND

In recent years, telecommunication devices have advanced from offering simple voice calling services within wireless communication networks to providing users with many new features. Telecommunication devices now provide messaging services such as email, text messaging, and instant messaging; data services such as Internet browsing; media services such as storing and playing a library of favorite songs; location services; and many others. Thus, telecommunication devices, referred to herein as mobile devices, are often used in multiple contexts. In addition to the new features provided by the telecommunication devices, users of such telecommunication devices have greatly increased. Such an increase in users is only expected to continue and in fact, it is expected that there could be a growth rate of twenty times more users in the next few years alone.

Duplicate international mobile equipment identities (IMEIs) for mobile devices are a major problem for operators of wireless communication networks since fake mobile devices with duplicate IMEIs can be used for nefarious purposes. For example, a mobile device with a fake or duplicate IMEI can access a wireless communication network for free and/or can be used for illegal activities. While the Global Mobile System Association (GSMA) is working on a Global Equipment Identity Register (GEIR), there are still issues with original equipment manufacturers (OEMs) having implementations that make it easy to change IMEIs since IMEI implementations by OEMs are not truly secure and can be modified on mobile devices using various tools.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
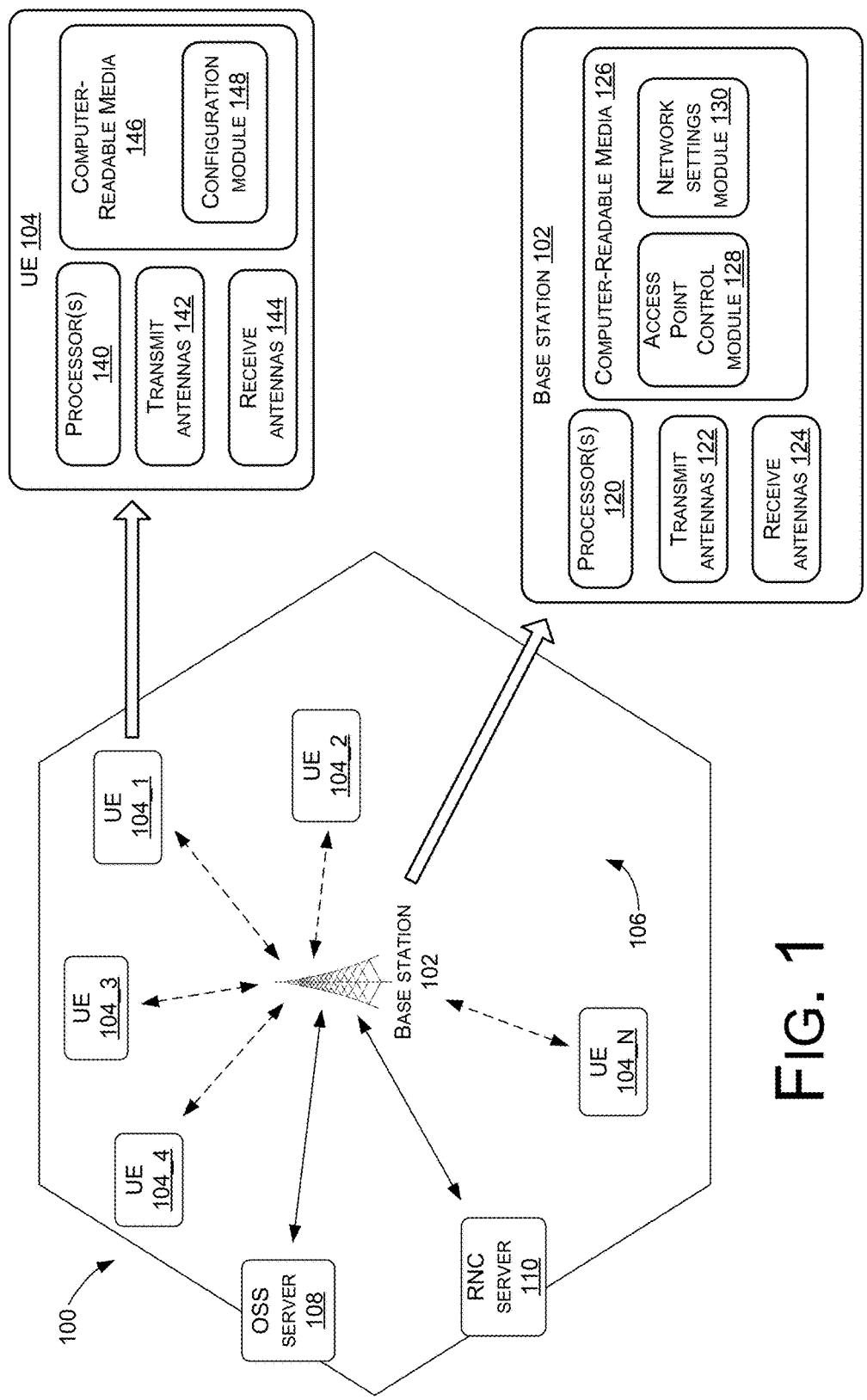
FIG. 1 schematically illustrates a wireless communication network, in accordance with various embodiments.

Described herein are techniques and architecture for securing international mobile equipment identities (IMEIs) for mobile devices and chipset serial numbers (S/N) on chipsets for mobile devices. As used herein, mobile devices include devices configured as Internet of Things (IoT) devices. Generally, Internet of Things refers to a network of physical objects—devices, vehicles, buildings and other items embedded with electronics, software, sensors, and network connectivity—that enables these objects to collect and exchange data. IoT allows objects to be sensed and controlled remotely across existing network infrastructure, creating opportunities for more direct integration of the physical world into computer-based systems, and resulting in improved efficiency, accuracy and economic benefit. When IoT is augmented with sensors and actuators, the technology becomes an instance of the more general class of cyber-physical systems, which also encompasses technologies such as smart grids, smart homes, intelligent transportation and smart cities. Each thing is uniquely identifiable through its embedded computing system, but is able to interoperate within the existing Internet infrastructure.

In embodiments, a mobile device IMEI and a chipset S/N are implemented in electronic fuses (e-fuses) on a chipset as part of a TrustZone. As is known, TrustZone provides an alternative to adding another dedicated security core to a System on Chip (SoC) by providing two virtual processors backed by hardware based access control. This allows the application core to switch between two states, referred to as worlds (to reduce confusion with other names for capability domains), in order to prevent information from leaking from a more trusted world to a less trusted world. This world switch is generally orthogonal to all other capabilities of the processor. Thus each world can operate independently of the other while using the same core. Memory and peripherals are then made aware of the operating world of the core and may use this to provide access control to secrets and code on the chipset. Trustlets monitor and report the status of the IMEI and the chipset S/N stored in one or more e-fuses on the chipset. The chipset vendors maintain an IMEI and chipset S/N database for chipsets that they manufacture. The chipset vendors share those parameters to a database, such as, for example, the Global Mobile System Association (GSMA) Global Equipment Identity Register (GEIR). Additionally, other parameters may be stored in the e-fuses on the chipsets. For example, a date of manufacture of the chipset, the location where the chipset was manufactured, and/or an operator of a wireless communication network for which a mobile device that will include the chipset is destined for use can be stored in e-fuses of the chipset.

In embodiments, when a mobile device attempts to register, i.e. access, a wireless communication network, a gateway of the wireless communication network can receive the IMEI and the chipset S/N from the mobile device. For example, the request to register received from the mobile device may include the IMEI and corresponding chipset S/N stored on the mobile device's chipset. The gateway can then check the appropriate database, e.g., the GSMA GEIR, to see if the IMEI and the corresponding chipset S/N are included within the database, thereby signaling that the IMEI and the corresponding chipset S/N are authentic. If so, the gateway of the wireless communication network can allow the mobile device to access the wireless communication network. If however the IMEI and corresponding chipset S/N are not listed in the database and thus not authentic, then the wireless communication network gateway can deny access to the mobile device for accessing the wireless communication network.

In embodiments, other parameters can be utilized and analyzed in order to determine if a mobile device is authentic and should be allowed access to the wireless communication network. For example, if a mobile device has accessed the wireless communication network and another mobile device attempts to access the wireless communication network and provides the same IMEI and corresponding chipset S/N, then the gateway of the wireless communication network can check other parameters in order to determine which of the two devices is fake, thereby helping minimize the possibility of not allowing access to the wireless communication network for the proper mobile device. For example, a refrigerator that is configured as an IoT device previously had always accessed a wireless communication network in New York. However, if the next day the refrigerator suddenly attempts to access the wireless communication network in California, then it is likely that the IoT device attempting to access the wireless communication network in California is a fake. However, if the mobile device attempting to access the wireless communication network in California is actually a mobile phone, then further analytics may need to be performed with parameters since it is possible that the owner of the mobile phone has flown from New York to California. Also, if one of two devices attempting to access the wireless communication network does not provide extra parameters in addition to the IMEI and corresponding chipset S/N, then the mobile device that does not include the extra parameters may be identified as the fake mobile device.

FIG. 1 illustrates a wireless communication network 100 (also referred to herein as network 100). The network 100 comprises a base station (BS) 102 communicatively coupled to a plurality of user devices, referred to as UEs 104_1, 104_2, ..., 104_N, where N is an appropriate integer. The BS 102 serves UEs 104 located within a geographical area, e.g., within a macro cell 106. FIG. 1 illustrates the macro cell 106 to be hexagonal in shape, although other shapes of the macro cell 106 may also be possible. In general, the network 100 comprises a plurality of macro cells 106, with each macro cell 106 including one or more BSs 102.

In an embodiment, the UEs 104_1, ..., 104_N may comprise any appropriate devices for communicating over a wireless communication network. Such devices include mobile telephones, cellular telephones, mobile computers, Personal Digital Assistants (PDAs), radio frequency devices, handheld computers, laptop computers, tablet computers, palmtops, pagers, devices configured as IoT devices, integrated devices combining one or more of the preceding devices, and/or the like. As such, UEs 104_1, ..., 104_N may range widely in terms of capabilities and features. For example, one of the UEs 104_1, ..., 104_N may have a numeric keypad, a capability to display only a few lines of text and be configured to interoperate with only Global System for Mobile Communications (GSM) networks. However, another of the UEs 104_1, ..., 104_N (e.g., a smart phone) may have a touch-sensitive screen, a stylus, an embedded GPS receiver, and a relatively high-resolution display, and be configured to interoperate with multiple types of networks. UEs 104_1, ..., 104_N may also include SIM-less devices (i.e., mobile devices that do not contain a functional subscriber identity module ("SIM")), roaming mobile devices (i.e., mobile devices operating outside of their home access networks), and/or mobile software applications.

In an embodiment, the BS 102 may communicate voice traffic and/or data traffic with one or more of the UEs 104_1, ..., 104_N. The BS 102 may communicate with the UEs 104_1, ..., 104_N using one or more appropriate wireless communication protocols or standards. For example, the BS 102 may communicate with the UEs 104_1, ..., 104_N using one or more standards, including but not limited to GSM, Time Division Multiple Access (TDMA), Universal Mobile Telecommunications System (UMTS), Evolution-Data Optimized (EVDO), Long Term Evolution (LTE), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), WiMAX protocols (including IEEE 802.16e-2005 and IEEE 802.16m protocols), High Speed Packet Access (HSPA), (including High Speed Downlink Packet Access (HSDPA) and High Speed Uplink Packet Access (HSUPA)), Ultra Mobile Broadband (UMB), and/or the like.

The BS 102 may be communicatively coupled (e.g., using a backhaul connection, illustrated using solid lines in FIG. 1) to a number of backhaul equipment, e.g., an operation support subsystem (OSS) server 108, a radio network controller (RNC) 110, and/or the like. The RNC 110 generally serves as a gateway for the wireless communication network 100 and can also be in the form of a mobility management entity when the wireless communication network 100 operates according to the long term evolution (LTE) standard or LTE Advanced standard.

In an embodiment, the base station 102 may comprise processors 120, one or more transmit antennas (transmitters) 122, one or more receive antennas (receivers) 124, and computer-readable media 126. The processors 120 may be configured to execute instructions, which may be stored in the computer-readable media 126 or in other computer-readable media accessible to the processors 120. In some embodiments, the processors 120 are a central processing unit (CPU), a graphics processing unit (GPU), or both CPU and GPU, or any other sort of processing unit. The base station 102 can also be in the form of a Node B (where the wireless communication network 100 is 3G UMTS network) or in the form of an eNode B (where the wireless communication network 100 operates according to the LTE standard or LTE Advanced standard).

The one or more transmit antennas 122 may transmit signals to the UEs 104_1, ..., 104_N, and the one or more receive antennas 124 may receive signals from the UEs 104_1, ..., 104_N. The antennas 122 and 124 include any appropriate antennas known in the art. For example, antennas 122 and 124 may include radio transmitters and radio receivers that perform the function of transmitting and receiving radio frequency communications. In an embodiment, the antennas 122 and 124 may be included in a transceiver module of the BS 102.

The computer-readable media 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by the base station 102. The computer-readable media 126 may reside within the base station 102, on one or more storage devices accessible on a local network to the base station 102, on cloud storage accessible via a wide area network to the base station 102, or in any other accessible location.

The computer-readable media 126 may store modules, such as instructions, data stores, and so forth that are configured to execute on the processors 120. For instance, the computer-readable media 126 may store an access point control module 128 and a network settings module 130, as will be discussed in more detail herein later.

Although FIG. 1 illustrates the computer-readable media 126 in the BS 102 storing the access point control module 128 and the network settings module 130, in various other embodiments, the access point control module 128, the network settings module 130, and one or more other modules (not illustrated, may be stored in another component of the network 100 (e.g., other than the BS 102). For example, one or more of these modules may be stored in a computer-readable media included in the OSS server 108, the RNC 110, another appropriate server associated with the network 10, and/or the like.

Although not illustrated in FIG. 1, various other modules (e.g., an operating system module, basic input/output systems (BIOS), etc.) may also be stored in the computer-readable media 126. Furthermore, although not illustrated in FIG. 1, the base station 102 may comprise several other components, e.g., a power bus configured to supply power to various components of the base station 102, one or more interfaces to communicate with various backhaul equipment, and/or the like.

In an embodiment, the UEs 104 may comprise processors 140, one or more transmit antennas (transmitters) 142, one or more receive antennas (receivers) 144, and computer-readable media 146. The processors 140 may be configured to execute instructions, which may be stored in the computer-readable media 146 or in other computer-readable media accessible to the processors 140. In some embodiments, the processors 140 is a central processing unit (CPU), a graphics processing unit (GPU), or both CPU and GPU, or any other sort of processing unit. The one or more transmit antennas 142 may transmit signals to the base station 102, and the one or more receive antennas 144 may receive signals from the base station 102. In an embodiment, the antennas 142 and 144 may be included in a transceiver module of the UE 104.

The computer-readable media 146 may also include CRSM. The CRSM may be any available physical media accessible by a computing device to implement the instructions stored thereon. CRSM may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which can be used to store the desired information and which can be accessed by the UE 14.

The computer-readable media 146 may store several modules, such as instructions, data stores, and so forth that are configured to execute on the processors 140. For instance, the computer-readable media 140 may store a configuration module 148. Although not illustrated in FIG. 1, the computer-readable media 146 may also store one or more applications configured to receive and/or provide voice, data and messages (e.g., short message service (SMS) messages, multi-media message service (MMS) messages, instant messaging (IM) messages, enhanced message service (EMS) messages, etc.) to and/or from another device or component (e.g., the base station 102, other UEs, etc.).

Although not illustrated in FIG. 1, the UEs 104 may also comprise various other components, e.g., a battery, a charging unit, one or more network interfaces, an audio interface, a display, a keypad or keyboard, a GPS receiver and/or other location determination component, and other input and/or output interfaces.

Although FIG. 1 illustrates only one UE (UE 104 1) in detail, each of the UEs 104_2, . . . , 104_N may have a structure that is at least in part similar to that of the UE 104_1. For example, similar to the UE 104_1, each of the UEs 104_2, . . . , 104_N may comprise processors, one or more transmit antennas, one or more receive antennas, and computer-readable media including a configuration module.

In an embodiment, the network settings module 130 stored in the computer-readable media 126 maintains a plurality of network settings associated with the network 10. Individual network settings maintained by the network settings module 130 may be pertinent to a single UE of the UEs 104 _1, . . . , 104_N, a subset of the UEs 104_1, . . . , 104_N, or each of the UEs 104_1, . . . , 104_N. For example, a network setting of the plurality of network settings may specify a maximum bit rate at which a UE (or each of the UEs 104_1, . . . , 104_N) may transmit data to the BS 102. Another network setting of the plurality of network settings may specify a transmit time interval (tti) used by each of the UEs 104_1, . . . , 104_N to transmit data to the BS 102. Yet another network setting of the plurality of network settings may specify a maximum power that each of the UEs 104_1, . . . , 104_N may use to transmit data to the BS 102. The plurality of network settings maintained by the network settings module 130 may also include any other appropriate type of network settings.

In an embodiment, one or more of the plurality of network settings maintained by the network settings module 130 may be communicated to the UEs 104_1, . . . , 104_N (e.g., by the transmit antennas 122 to the receive antennas 144 of the UEs 104_1, . . . , 104_N). Based on receiving the network settings, the UEs 104_1, . . . , 104_N (e.g., the corresponding configuration modules 148) may configure themselves and communicate with the BS 102 accordingly.

Figure 2:
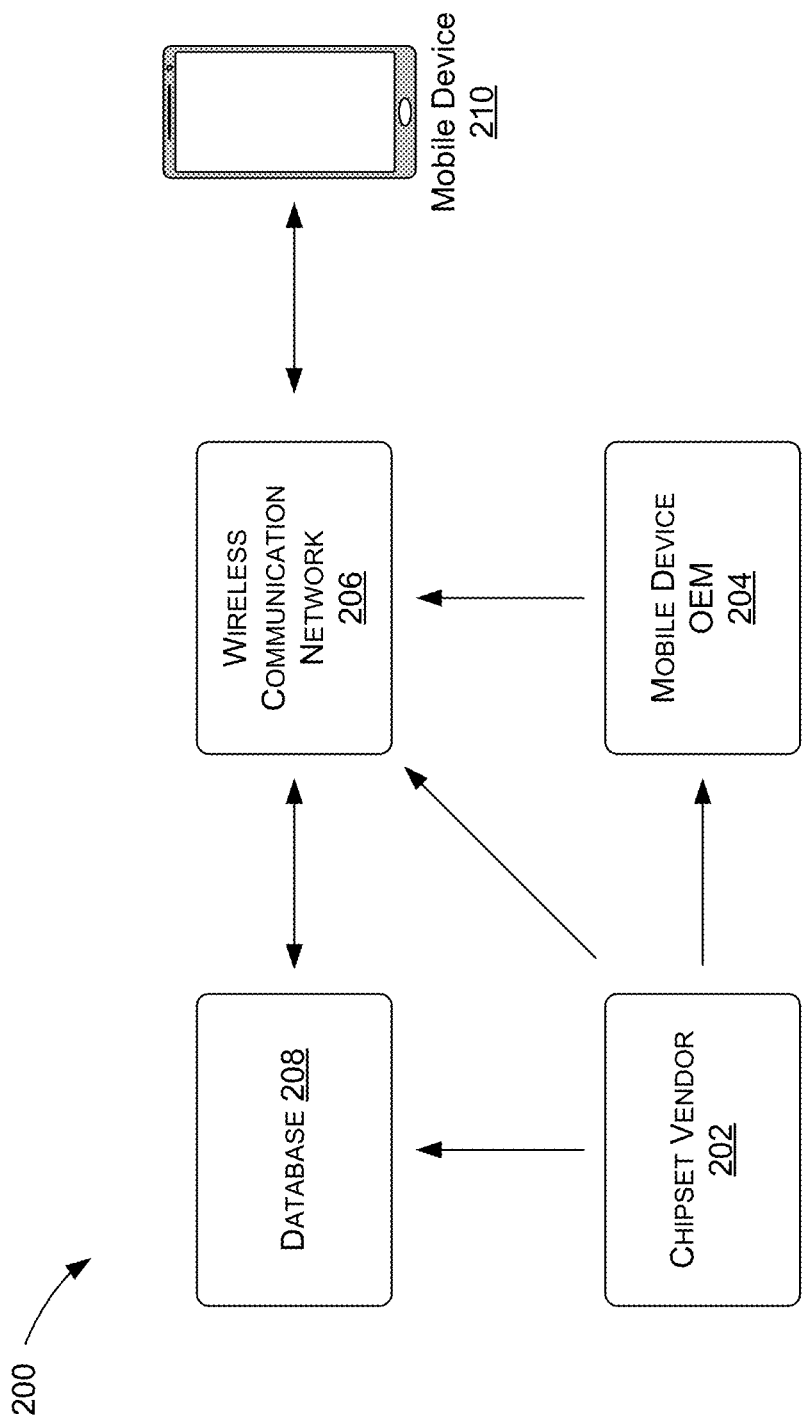
FIG. 2 schematically illustrates an arrangement for securing IMEIs and chipset S/Ns for mobile devices.

FIG. 2 schematically illustrates an arrangement 200 for securing IMEIs and chipset S/Ns for mobile devices, e.g., UEs 104. A chipset vendor 202 manufactures chipsets for mobile devices, e.g., UEs 104. During manufacture of the chipsets, the chipset vendor 202 burns an IMEI and a corresponding chipset S/N into one or more e-fuses of a corresponding chipset as part of a TrustZone. A trustlet monitors and safeguards the IMEI and corresponding chipset S/N from being changed in the future. Thus, in embodiments, the stored IMEI and chipset S/N stored in the e-fuses may be made tamper-proof by using the TrustZone and Trustlet combination.

The chipset vendor 202 provides the IMEI and the chipset S/N information to an original equipment manufacturer (OEM) 204 that utilizes the chipsets in the manufacture of mobile devices, e.g., UEs 104. In embodiments, the chipset vendor 202 maintains a database of the IMEIs and corresponding chipset S/Ns. As the mobile device OEMs 204 manufacture mobile devices, the IMEIs and corresponding chipset S/Ns for the manufactured mobile devices are provided to a wireless communication network 206, e.g., wireless communication network 100, and also provided to a database 208 such as, for example, the GSMA GEIR. The database 208, in embodiments, may be maintained by the wireless communication network 206. Also, the chipset vendor 202 may, in embodiments, provide the IMEIs and corresponding chipset S/Ns to the wireless communication network 206 and/or the database 208.

When a mobile device 210 attempts to access the wireless communication network 206, the gateway of the wireless communication network 206 checks the database 208 to verify the IMEI and the corresponding chipset S/N that the mobile device 210 provides with its request to access the wireless communication network 206. In embodiments, the IMEI and the corresponding chipset S/N are provided to the wireless communication network 206 by the mobile device 210 separately from the request to access the wireless communication network 206. The gateway of the wireless communication network 206 checks the database 208. If the IMEI and corresponding chipset S/N are listed within the database 208, and thus as authentic, then the gateway of the wireless communication network 206 allows the mobile device 210 to access the wireless communication network 206. If the IMEI and corresponding chipset S/N are not listed within the database 208, and thus not authentic, then the gateway of the wireless communication network 206 denies the mobile device 210 access to the wireless communication network 206. The mobile device 210 may be listed as a "fake" mobile device by the wireless communication network 206.

Additional parameters and information can be burned into the e-fuses by the chipset vendor 202. Such parameters can include, for example, a date of manufacture of the chipset, a location where the chipset was manufactured, and/or a particular wireless communication network for which a mobile device that includes the chipset is destined for sale and use on the particular wireless communication network. More parameters may be burned into the e-fuses if desired and the list of examples for the parameters is not meant to be limiting.

The additional parameters can be used to help monitor and verify the authenticity of the mobile device 210 that is attempting to access the wireless communication network 206. For example, the chipset may have been manufactured in Louisville for a refrigerator configured as an IoT device. The refrigerator may be sold to a user in the Portland Metro region. Thus, the refrigerator will typically, as an IoT device, attempt to access a wireless communication network within the Portland Metro area. If suddenly the refrigerator attempts to access a wireless communication network in China, then more than likely, the device attempting to access the wireless communication network in China is probably a fake. Global Positioning System (GPS) monitoring can be utilized to monitor the locations of the various devices that are attempting to access the wireless communication networks in various geographical regions. If the type of device attempting to access a wireless communication network is, for example, a mobile phone, then the appearance of the device in China instead of the Portland Metro area may not be cause for alarm and other metrics or parameters may need to be analyzed in order to determine if the device attempting to access the wireless communication network is authentic.

If a mobile device 210 has accessed the wireless communication network 206 and another mobile device (not illustrated) attempts to access the wireless communication network 206 by providing the same IMEI and corresponding chipset S/N, then the gateway of the wireless communication network 206 can check additional parameters in order to determine which of the two devices is fake, thereby helping minimize the possibility of not allowing access to the wireless communication network 206 for the proper mobile device. Additionally, if one of the two devices attempting to access the wireless communication network does not provide additional parameters in addition to the IMEI and corresponding chipset S/N, then the mobile device that does not include the additional parameters may be identified as the fake mobile device.

Thus, the various techniques and arrangements disclosed herein can be utilized to secure IMEIs and chipset S/Ns for chipsets of mobile devices and for authenticating mobile devices accessing wireless communication networks.

Figure 3:
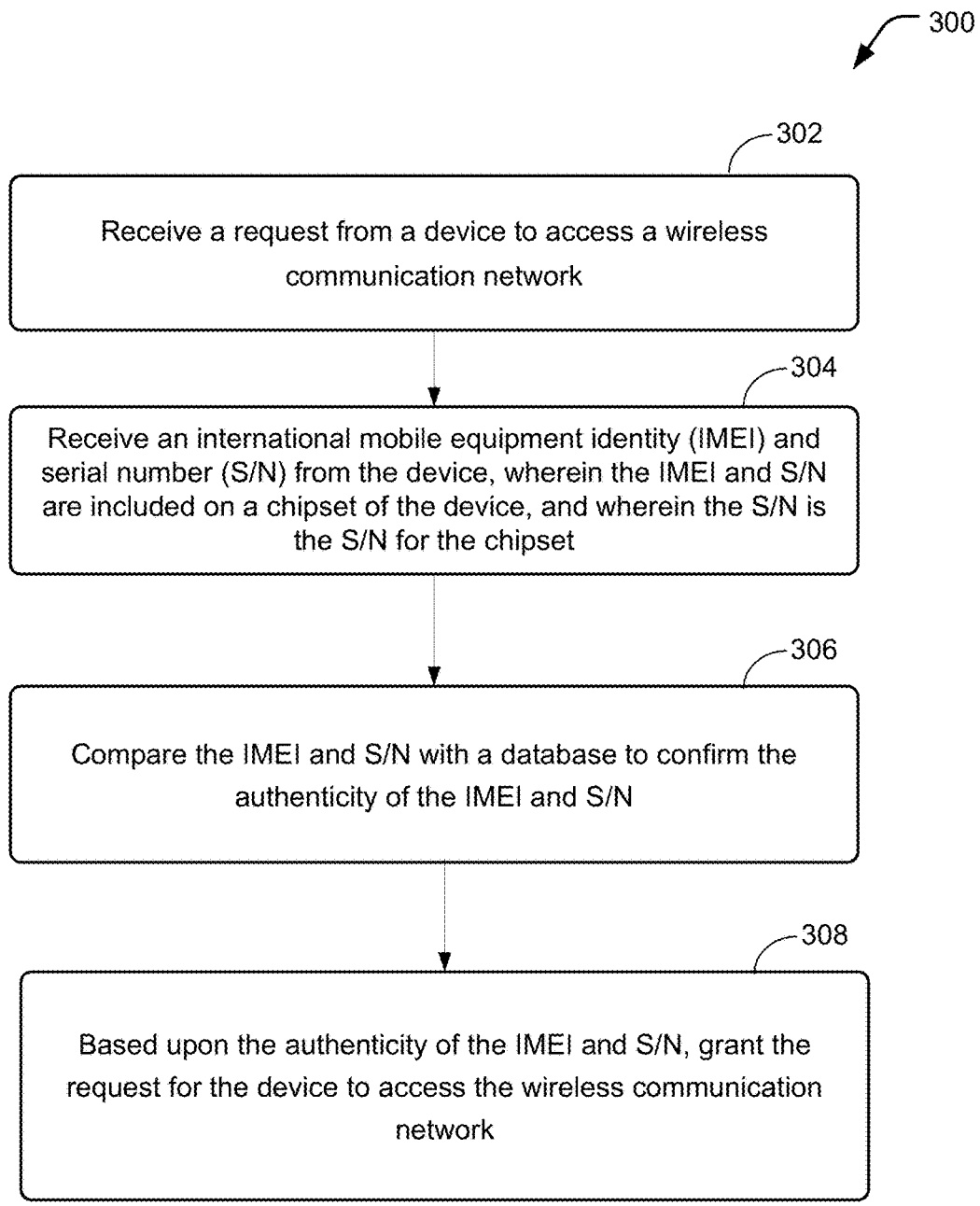
FIG. 3 is a flowchart illustrating an example method of verifying IMEIs and chipset S/Ns of mobile devices within the wireless communication network of FIG. 1, in accordance with various embodiments.

FIG. 3 is a flowchart illustrating a method 300 of verifying IMEIs and chipset S/Ns of mobile devices within a wireless communication network, e.g., wireless communication network 100. As illustrated, at block 302, a request is received from a device to access the wireless communication network. At block 304, an international mobile equipment identity (IMEI) and serial number (S/N) are received from the device, wherein the IMEI and S/N are included on a chipset of the device, and wherein the S/N is the S/N for the chipset. At block 306, the IMEI and S/N are compared with a database to confirm the authenticity of the IMEI and S/N. At block 308, based upon the authenticity of the IMEI and S/N, the request is granted for the device to access the wireless communication network.

Figure 4:
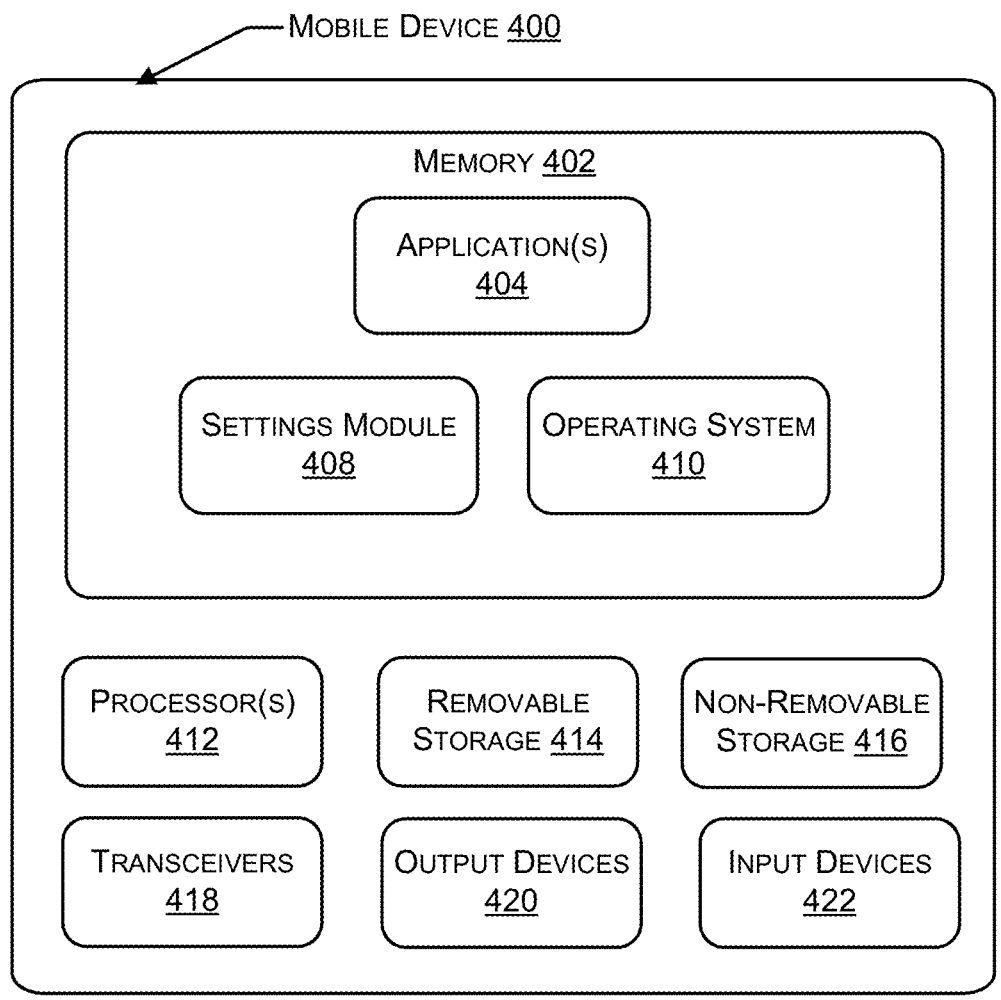
FIG. 4 illustrates a component level view of an example mobile device configured for use in the wireless communication network of FIG. 1 and the arrangement of FIG. 2.

FIG. 4 illustrates a component level view of a mobile device 400, such as UE 104, configured to function within the wireless communication network 100 and arrangement 200. As illustrated, the mobile device 400 comprises a system memory 402 storing application(s) 404, a settings module 408, and an operating system 410. Also, the mobile device 400 includes processor(s) 412, a removable storage 414, a non-removable storage 416, transceivers 418, output device(s) 420, and input device(s) 422. In various implementations, system memory 402 is volatile (such as RAM), non-volatile (such as ROM, flash memory, etc.) or some combination of the two. In some implementations, the processor(s) 412 is a central processing unit (CPU), a graphics processing unit (GPU), or both CPU and GPU, or any other sort of processing unit.

The mobile device 400 may also include additional data storage devices (removable and/or non-removable) such as, for example, magnetic disks, optical disks, or tape. Such additional data storage may include removable storage 414 and non-removable storage 416.

Non-transitory computer-readable media may include volatile and nonvolatile, removable and non-removable tangible, physical media implemented in technology for storage of information, such as computer readable instructions, data structures, program modules, or other data. System memory 402, removable storage 414 and non-removable storage 416 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the user device 400. Any such non-transitory computer-readable media may be part of the user device 400.

In some implementations, the transceivers 418 include any sort of transceivers known in the art. For example, the transceivers 418 may include a radio transceiver that performs the function of transmitting and receiving radio frequency communications via an antenna. Also or instead, the transceivers 418 may include wireless modem(s) to may facilitate wireless connectivity with other computing devices. Further, the transceivers 418 may include wired communication components, such as an Ethernet port, for communicating with other networked devices.

In some implementations, the output devices 420 include any sort of output devices known in the art, such as a display (e.g., a liquid crystal display), speakers, a vibrating mechanism, or a tactile feedback mechanism. Output devices 420 also include ports for one or more peripheral devices, such as headphones, peripheral speakers, or a peripheral display.

In various implementations, input devices 422 include any sort of input devices known in the art. For example, input devices 422 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Figure 5:
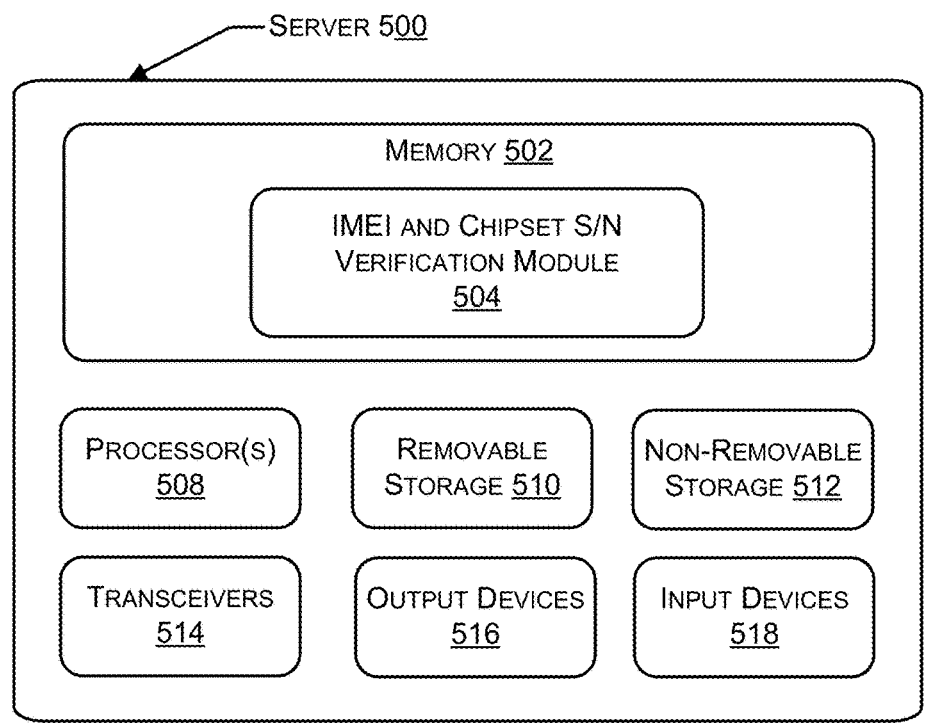
FIG. 5 illustrates a component level view of a server configured to verify IMEIs and chipset S/Ns of mobile devices within the wireless communication network of FIG. 1 and the arrangement of FIG. 2.

FIG. 5 illustrates a component level view of a server configured to verify IMEIs and chipset S/Ns of mobile devices, e.g., UEs 104, within a wireless communication network, e.g., wireless communication network 100, according to the techniques described herein. The server 500 may be located in the RNC or gateway 110. Additionally, the server 500 may be a separate entity located separately from the RNC 110. As illustrated, the server 500 comprises a system memory 502. The system memory 502 includes an IMEI and Chipset S/N Verification Module 504. Also, the server 500 includes processor(s) 508, a removable storage 510, a non-removable storage 512, transceivers 514, output device(s) 516, and input device(s) 518.

In various implementations, system memory 502 is volatile (such as RAM), non-volatile (such as ROM, flash memory, etc.) or some combination of the two. The IMEI and Chipset S/N Verification Module 504 is configured to verify the authenticity of IMEIs and chipset S/Ns of mobile devices in conjunction with one or more processors 508 in accordance with the various techniques described herein.

In some implementations, the processor(s) 508 is a central processing unit (CPU), a graphics processing unit (GPU), or both CPU and GPU, or any other sort of processing unit.

The server 500 may also include additional data storage devices (removable and/or non-removable) such as, for example, magnetic disks, optical disks, or tape. Such additional storage is illustrated in FIG. 5 by removable storage 510 and non-removable storage 512.

Non-transitory computer-readable media may include volatile and nonvolatile, removable and non-removable tangible, physical media implemented in technology for storage of information, such as computer readable instructions, data structures, program modules, or other data. System memory 502, removable storage 510 and non-removable storage 512 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the server 500. Any such non-transitory computer-readable media may be part of the server 500.

In some implementations, the transceivers 514 include any sort of transceivers known in the art. For example, the transceivers 514 may include wired communication components, such as an Ethernet port, for communicating with other networked devices. Also or instead, the transceivers 514 may include wireless modem(s) to may facilitate wireless connectivity with other computing devices. Further, the transceivers 514 may include a radio transceiver that performs the function of transmitting and receiving radio frequency communications via an antenna.

In some implementations, the output devices 516 include any sort of output devices known in the art, such as a display (e.g., a liquid crystal display), speakers, a vibrating mechanism, or a tactile feedback mechanism. Output devices 516 also include ports for one or more peripheral devices, such as headphones, peripheral speakers, or a peripheral display.

In various implementations, input devices 518 include any sort of input devices known in the art. For example, input devices 518 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method comprising:
    receiving a request from a device to register with a wireless communication network;
    receiving, from the device, an international mobile equipment identity (IMEI) and a serial number (S/N) that are expected, based on information provided by a chipset vendor to the wireless communication network, to be stored in tamper-proof form as part of a trust zone in at least one electronic fuse of a chipset of the device, wherein the S/N is the S/N for the chipset;
    comparing the IMEI and the S/N with the information in a database to confirm an authenticity of the IMEI and the S/N; and
    based upon confirming the authenticity of the IMEI and the S/N, granting the request to register with the wireless communication network.

2. The method of claim 1, wherein the device is a mobile device.

3. The method of claim 1, wherein the device is an Internet of Things (loT) device.

4. The method of claim 1, wherein the device is a first device and the method further comprises:
    receiving a second request from a second device to register with the wireless communication network;
    receiving the IMEI and the S/N from the second device, wherein the IMEI and the S/N received from the second device are the same as the IMEI and the S/N received from the first device;
    receiving parameters from the first device and the second device, wherein the parameters are stored in the chipset of the first device and a second chipset of the second device
    analyzing the parameters; and based upon analyzing the parameters, denying the second request from the second device to register with the wireless communication network.

5. The method of claim 4, wherein the parameters comprise at least one of (i) a date of manufacture of the chipset or the second chipset, (ii) a location where the chipset or the second chipset was manufactured, or (iii) an identifier of an operator of the wireless communication network.

6. The method of claim 1, wherein the device is a first device and the method further comprises:
 receiving a second request from a second device to register with the wireless communication network;
 receiving the IMEI and the S/N from the second device, wherein the IMEI and the S/N received from the second device are the same as the IMEI and the S/N received from the first device;
 receiving parameters from the first device and the second device, wherein the parameters are stored in the chipset of the first device and a second chipset of the second device;
 analyzing the parameters; and
 based upon analyzing the parameters, (i) denying the first device access to the wireless communication network and (ii) granting the second request from the second device to register with the wireless communication network.

7. The method of claim 6, wherein the parameters comprise at least one of (i) a date of manufacture of the chipset or the second chipset, (ii) a location where the chipset or the second chipset was manufactured, or (iii) an identifier of an operator of the wireless communication network.

8. The method of claim 1, wherein the device is a first device and the method further comprises:
 receiving a second request from a second device to register with the wireless communication network;
 determining a current location of the second device;
 comparing the current location of the second device with a previous location of the second device; and
 based upon comparing the current location of the second device with a previous location of the second device, denying the second request from the second device to register with the wireless communication network.

9. A gateway of a wireless communication network comprising:
 a processor; and
 instructions that, when executed by the processor, cause the gateway to perform operations including:
  receiving a request from a device to register with the wireless communication network;
  receiving, from the device, an international mobile equipment identity (IMEI) and a serial number (S/N) that are expected, based on information provided by a chipset vendor to the wireless communication network, to be stored in tamper-proof form as part of a trust zone in at least one electronic fuse of a chipset of the device, wherein the S/N is the S/N for the chipset;
  comparing the IMEI and the S/N with the information in a database to confirm an authenticity of the IMEI and the S/N; and
  based upon confirming the authenticity of the IMEI and the S/N, granting the request to register with the wireless communication network.

10. The gateway of claim 9, wherein the device is a first device and the operations further comprise:
 receiving a second request from a second device to register with the wireless communication network;
 receiving the IMEI and the S/N from the second device, wherein the IMEI and the S/N received from the second device are the same as the IMEI and the S/N received from the first device;
 receiving parameters from the first device and the second device, wherein the parameters are stored in the chipset of the first device and a second chipset of the second device;
 analyzing the parameters; and
 based upon analyzing the parameters, denying the second request from the second device to register with the wireless communication network.

11. The gateway of claim 10, wherein the device is a mobile device.

12. The gateway of claim 10, wherein the device is an Internet of Things (loT) device.

13. The gateway of claim 10, wherein the parameters comprise at least one of (i) a date of manufacture of the chipset, (ii) a location where the chipset was manufactured, or (iii) an identifier of an operator of the wireless communication network.

14. The gateway of claim 9, wherein the device is a first device and the operations further comprise:
 receiving a second request from a second device to register with the wireless communication network;
 determining a current location of the second device;
 comparing the current location of the second device with a previous location of the second device; and
 based upon comparing the current location of the second device with a previous location of the second device, denying the second request from the second device to register with the wireless communication network.

15. A method comprising:
 receiving a request from a device to register with a wireless communication network;
 receiving an international mobile equipment identity (IMEI) and a chipset serial number (S/N) from the device;
 determining whether the IMEI and the chipset S/N received from the device are associated with each other in a database comprising information provided by chipset vendors about IMEIs and chipset S/Ns the chipset vendors have stored in tamper-proof form as part of trust zones in one or more electronic fuses of chipsets manufactured by the chipset vendors; and
 granting or denying the request from the device to register with the wireless communication network based at least in part on the determination of whether the IMEI and the chipset S/N are associated with each other in the database.

16. The method of claim 15, further comprising:
 receiving a second request to register with the wireless communication network from a second device;
 receiving the IMEI and the chipset S/N from the second device, the IMEI and the chipset S/N received from the second device being the same as the IMEI and the chipset S/N received from the device;
 receiving at least one additional parameter from the device and/or the second device;
 comparing the at least one additional parameter against at least one expected parameter of a manufactured device that comprises a particular chipset in which one of the chipset vendors stored the IMEI and the chipset S/N, to determine which of the device and the second device is the manufactured device and which is faking the IMEI and the chipset S/N; and denying registration with the wireless communication network to the one of the device and the second device that is determined to be faking the IMEI and the chipset S/N.

17. The method of claim 16, wherein the at least one expected parameter of the manufactured device that comprises the particular chipset to which the at least one additional parameter is compared is one or more of a date of manufacture of the particular chipset, a location where the particular chipset was manufactured, and an identifier of the wireless communication network.

18. The method of claim 16, wherein the at least one expected parameter was stored in at least one electronic fuse of the manufactured device by the one of the chipset vendors.

19. The method of claim 15, further comprising:
receiving a second request to register with the wireless communication network from a second device;
receiving the IMEI and the chipset S/N from the second device, the IMEI and the chipset S/N received from the second device being the same as the IMEI and chipset S/N received from the device;
receiving, from one of the device and the second device, at least one additional parameter associated with a manufactured device that comprises a particular chipset in which one of the chipset vendors stored the IMEI and chipset S/N;
determining that an other one of the device and the second device that did not send the at least one additional parameter is not the manufactured device and is faking the IMEI and chipset S/N; and
denying registration with the wireless communication network to the other one of the device and the second device that is determined to be faking the IMEI and the chipset S/N.

20. The method of claim 19, wherein the at least one additional parameter is one or more of a date of manufacture of the particular chipset, a location where the particular chipset was manufactured, and an identifier of the wireless communication network.

\* \* \* \* \*